United States Patent
Yazzie, Jr.

(10) Patent No.: US 7,945,043 B1
(45) Date of Patent: May 17, 2011

(54) HANDS-FREE TELEPHONE HOLDER

(76) Inventor: Eddie R. Yazzie, Jr., West Jordan, UT (US)

( * ) Notice: Subject to any disclaimer, the term of this patent is extended or adjusted under 35 U.S.C. 154(b) by 343 days.

(21) Appl. No.: 12/290,320

(22) Filed: Oct. 29, 2008

Related U.S. Application Data

(60) Provisional application No. 61/070,681, filed on Mar. 25, 2008.

(51) Int. Cl.
*H04M 1/00* (2006.01)
*H04M 9/00* (2006.01)

(52) U.S. Cl. .................................... 379/446; 379/455

(58) Field of Classification Search .................. 379/430, 379/445, 446, 454; 455/569.1, 575.2, 575.6; 224/181, 930
See application file for complete search history.

(56) References Cited

U.S. PATENT DOCUMENTS

| | | | |
|---|---|---|---|
| 2,721,234 A | 10/1949 | Gillie | |
| 2,761,914 A | 5/1954 | Hall | |
| 3,091,670 A | 5/1963 | Hall | |
| 4,048,453 A | 9/1977 | Seidel | |
| 4,893,344 A | 1/1990 | Tragardh et al. | |
| 5,233,650 A | 8/1993 | Chan | |
| 5,689,558 A | 11/1997 | Osgood et al. | |
| 5,706,345 A | 1/1998 | Allen | |
| 5,828,749 A | 10/1998 | Brodskiy | |
| 6,038,312 A | 3/2000 | Bromley | |
| 6,374,090 B1 | 4/2002 | Morales | |
| 6,914,997 B2 | 7/2005 | MacDonald et al. | |
| 2005/0064918 A1 * | 3/2005 | Medhin | 455/575.2 |
| 2006/0199625 A1 | 9/2006 | Farrell | |
| 2007/0060209 A1 | 3/2007 | Medhin | |

FOREIGN PATENT DOCUMENTS

| | | | |
|---|---|---|---|
| GB | 2 413 916 | | 5/2004 |
| JP | 2007117693 | * | 5/2007 |

* cited by examiner

*Primary Examiner* — Tuan D Nguyen
(74) *Attorney, Agent, or Firm* — Brian C. Trask

(57) ABSTRACT

A holder effective to hold a telephone in operable association with a user's ear. The holder includes a band with a clamp formed by a cantilevered lever arm affixed to the band. Desirably, the band is adjustable to fit heads of different sizes. A telephone may be installed between the free end of the lever arm and the user's ear and cheek. An installed telephone is pressed in compression against a user's ear and cheek by a bias caused in the cantilevered arm by installation of the telephone. Preferred embodiments include provisions to adjust the clamp to fit telephones of different size and conformation.

20 Claims, 2 Drawing Sheets

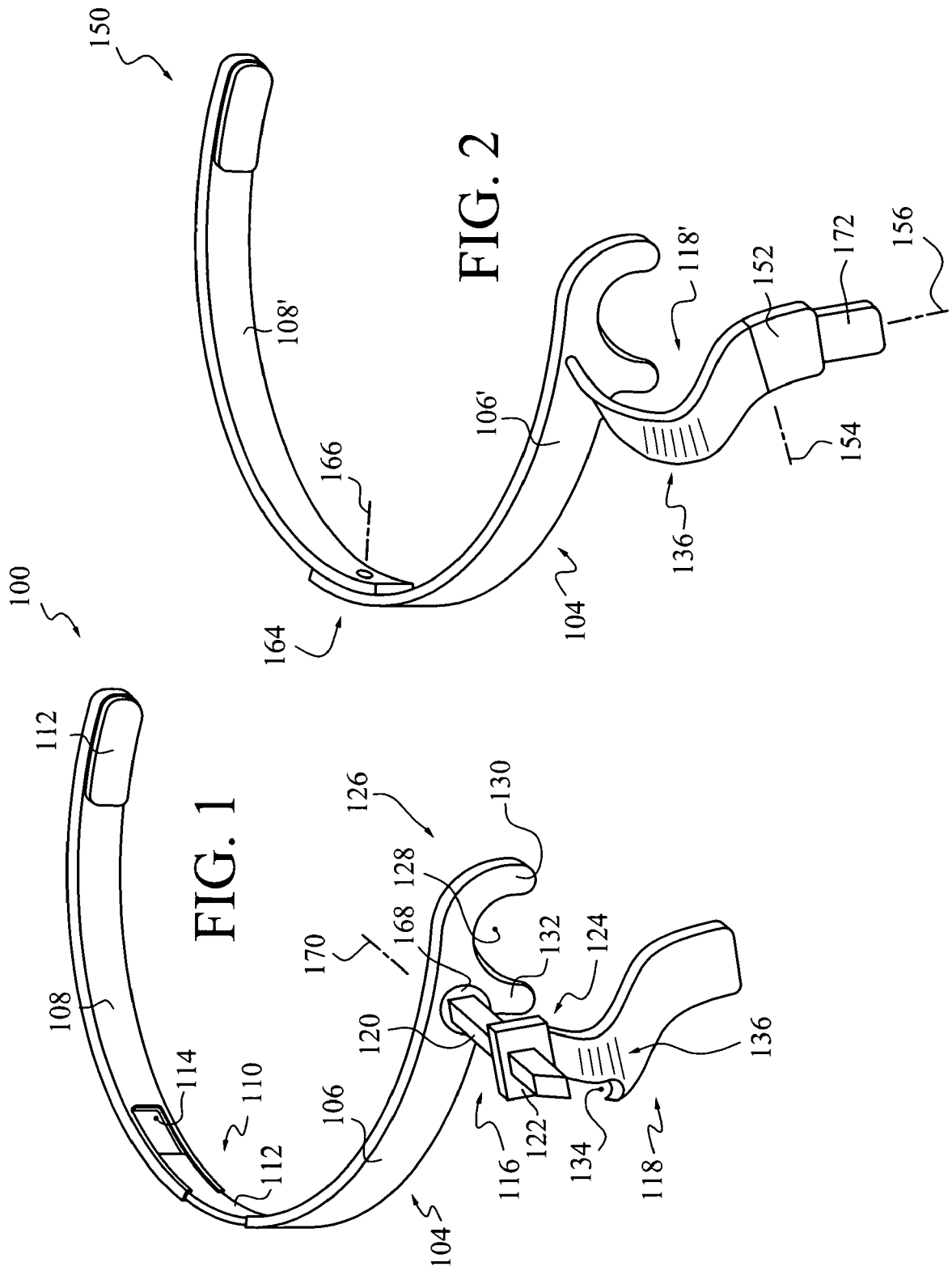

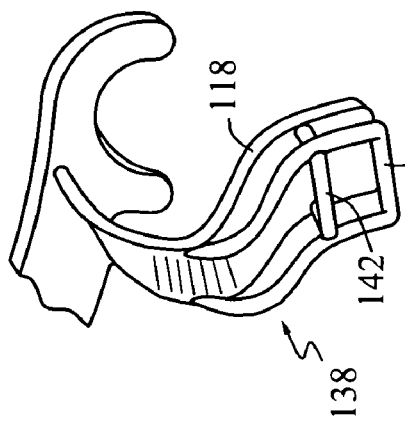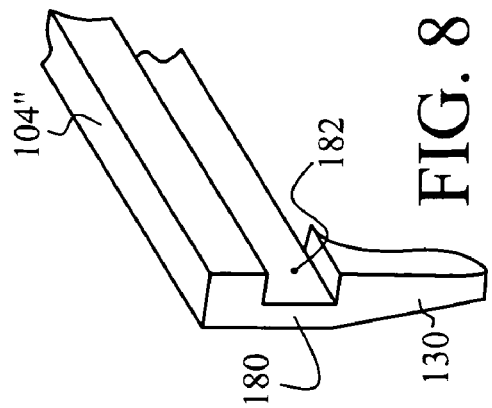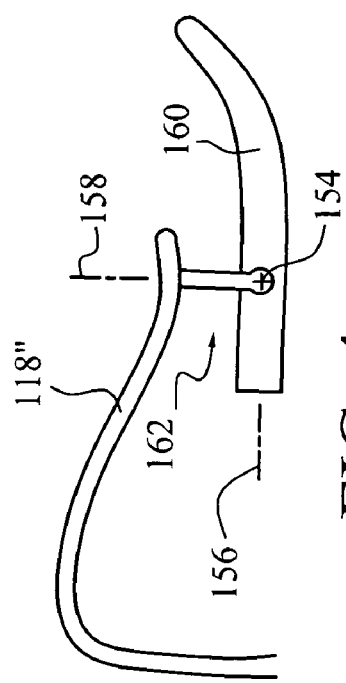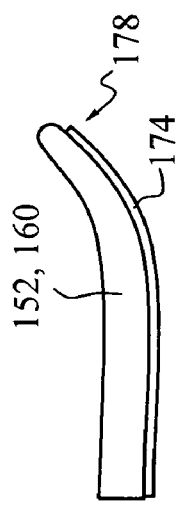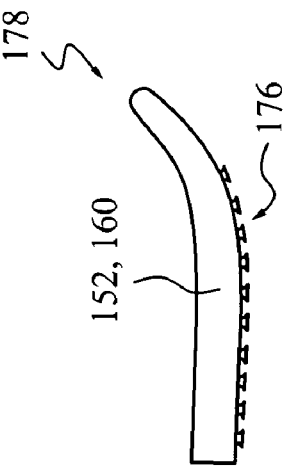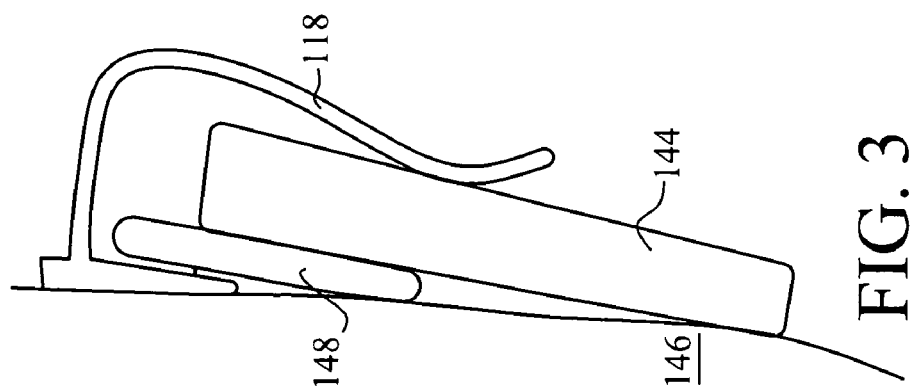

US 7,945,043 B1

HANDS-FREE TELEPHONE HOLDER

RELATED APPLICATIONS

This application claims the benefit under 35 U.S.C. 119(e) of the filing date of Provisional Application Ser. No. 61/070,681, filed Mar. 25, 2008, for "Hands-free telephone holder", the entire contents of which are hereby incorporated herein by reference.

BACKGROUND

1. Field of the Invention

This invention relates to devices that may be worn on a human head. It is particularly directed to a holder to support a telephone in hands-free operable registration with a user's ear.

2. State of the Art

It is sometimes desirable to be able to talk on a telephone while using both hands for a simultaneous activity. A relatively common example is talking on a ubiquitous cell telephone while driving. Unfortunately, using one hand to hold a cell telephone while driving is generally regarded as an unsafe practice.

One known telephone-holding implement may be attached to the handset of a corded telephone and includes a cradle to be placed on a user's shoulder. By leaning his/her head toward that shoulder, the handset may be held in compression against the user's ear for hands-free use. However, the required head-lean is generally uncomfortable after a period of time, and also undesirably compromises the user's freedom of motion.

Advances in modern electronics have permitted manufacture of light-weight telephones that operate using blue-tooth protocols. Certain of such telephones are structured to be carried substantially as a clip-on attachment to a user's ear, and thereby permit hands-free use of the telephone. However, to avail one's self of such freedom, a user must purchase a new telephone.

It would be an advance to provide a telephone holder that permits hands-free use of cell telephones.

BRIEF SUMMARY OF THE INVENTION

This invention provides an apparatus effective to hold a telephone in hands-free operable registration with a user's ear. The holder includes a band configured and arranged to partially encircle a human head. One preferred band comprises a length-adjusting mechanism configured to permit adjustment of a length of the band effective to fit the band to heads having different sizes.

A clamp mechanism is disposed in association with the band and is operable to hold a telephone in compression against a user's cheek and ear. An operable clamp mechanism includes an upstanding member affixed to the band, and a cantilevered lever arm associated with the upstanding member. One preferred clamp includes a cantilevered lever arm anchored at a proximal end to the band. Sometimes, the proximal portion of a clamp lever arm may be regarded as an upstanding member.

A cantilevered lever arm may include an extension link structured to increase an effective cantilevered length of the lever arm. Desirably, the distal end of a cantilevered lever arm is configured with an upturn to facilitate inserting a telephone under that distal end. In certain embodiments, the distal end of the cantilevered lever arm carries gripping means, such as friction-enhancing structure, to increase a holding force applied to the rear surface of a telephone.

Certain preferred lever arms include finger-hooking structure configured to permit application of a lifting force on the lever arm effective to facilitate installing a telephone. Certain finger-hooking structure is effective to stabilize the clamp while installing a telephone in a one-handed operation. One operable finger-hooking structure includes a rail spaced apart from a rear surface of the lever arm. Another finger-hooking structure includes a first rail and a second rail, both rails being spaced apart from a rear surface of the lever arm. In such case, the first rail and second rail may provide alternative locations at which a lifting force, or a stabilizing force, may be applied.

A lever arm may include a contact plate structured and arranged to pivot about a first axis effective to align a contact surface of the contact plate with a rear surface of a telephone. Sometimes, a contact plate is further structured and arranged to permit pivoting or swivelling the contact plate about a second axis that is disposed substantially orthogonal to the first axis.

Sometimes, a proximal portion of the lever arm may be associated with an upstanding member by way of a mechanism permitting adjustment of an anchor position of the lever arm with respect to the upstanding member effective to accommodate telephones having different thicknesses. In certain cases, a proximal portion of the upstanding member is pivotally affixed to the band.

Desirably, the band includes location structure configured to interface with the base of a wearer's ear. One operable location structure comprises an ear notch disposed between a front prong and a rear prong. Certain bands are structured to permit collapsing them for storage. Certain embodiments include bridge structure carried by the band and configured provide a channel in which to accommodate an ear piece of eye glasses.

BRIEF DESCRIPTION OF THE DRAWINGS

In the drawings, which illustrate what are currently considered to be the best modes for carrying out the invention:

FIG. 1 is a view in perspective of a first embodiment;

FIG. 2 is a view in perspective of a second embodiment;

FIG. 3 is a side view of an embodiment installed on a human head;

FIG. 4 is a side view of a clamp including a pivoting contact plate;

FIG. 5 is a side view of an alternative contact plate;

FIG. 6 is a side view of another alternative contact plate;

FIG. 7 is a view in perspective illustrating operable structure of an alternative lever arm; and FIG. 8 is an end view in perspective of an inside portion of an optionally structured band.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

FIG. 1 illustrates a first embodiment of a hands-free telephone holder, generally 100, structured according to certain principles of the instant invention. The hands-free telephone holder 100 includes a clamp mechanism, generally 102, connected to a band, generally 104. Band 104 includes a first side 106 and a second side 108 that are connected by way of a length adjusting mechanism, generally 110. Sometimes, padding, such as temple pad 112, may be included at one or more location to enhance comfort of the device when placed upon a human head.

Typically, band 104 is configured and arranged to partially encircle a human head. The illustrated band 104 is configured for its installation as a substantially horizontal member encircling the back part of a head to dispose band 104 in an approximately horizontal plane. It is within contemplation for an alternative band 104 to include the illustrated horizontal member, and an additional vertical member (not illustrated) disposed between side 106 and 108 to encircle over the top of a head. It is further within contemplation for an alternative band 104 to include only a vertical member disposed to encircle substantially over the top of a head, or at some other angle with respect to horizontal.

Length-adjusting mechanism 110 permits making changes in overall length of the band 104 effective to fit human heads having different sizes. The illustrated length-adjusting mechanism 110 includes a tongue 112 affixed to first side 106. Tongue 112 is slidably disposed in a cooperating groove system 114 that is carried by second side 108. Relative motion between installed parts may be sufficient to resist undesired changes in length. In other cases, a catch mechanism may be included to resist motion of a tongue with respect to the groove. The adjustable overall length of band 104 is determined by the amount of length of tongue 112 that is engaged inside groove system 114.

As will be appreciated by one of ordinary skill in the art, there are many other operable length-adjusting mechanisms that are effective to permit forming the desired changes in length of a band. Length-adjusting mechanisms within contemplation include various sliding, folding, telescoping, and extending mechanisms. Further, a length-adjusting mechanism may be disposed at any desired location along the band, and more than a single such mechanism may be included in a band.

The clamp mechanism 102 illustrated in FIG. 1 includes a foundation, generally 116, and a lever arm, generally 118. The foundation 116 is operable to hold the clamp lever 118 in association with the band 104. With reference still to FIG. 1, foundation 116 includes upstanding member 120, which is affixed at one end to the band 104. Clamp lever 118 is associated with upstanding member 120 by way of base 122. Base 122 and upstanding member 120 cooperatively form a thickness-adjusting mechanism, generally 124, permitting adjustment of an anchor position of lever 118 with respect to upstanding member 120 to accommodate telephones having different thicknesses.

An operable thickness-adjusting mechanism 124 includes any sort of structural arrangement that permits disposing lever 118 at a desired offset distance from the wearer's cheek. Preferred thickness-adjusting mechanisms 124 accommodate telephones having a range of thicknesses, as well as different telephone configurations, including clam-shell and candy bar shapes.

In the embodiment of mechanism 124 illustrated in FIG. 1, an adjustable friction interface is formed between base 122 and upstanding member 120. The base 122 may simply be slid up or down along the length of upstanding member 120 to a desired location effective to hold a telephone in compression against the wearer's cheek and ear. Placing a telephone under the free end of lever 118 causes a moment that further secures the base 122 from relative motion with respect to upstanding member 120.

It is within contemplation to include one or more catch mechanism, such as a clamping device, operable to affix the lever 118 to the upstanding member 120. Sometimes, the lever arm 118, itself, may be structured having sufficient flexibility such that bending along its length is sufficient to accommodate a desired wide range in telephone configurations. In other cases, certain embodiments of a telephone holder may include a mechanism, perhaps including structure such as a hinge, that provides for more localized flexibility.

Desirably, a band 104 includes location structure, generally 126, effective to orient a lever arm 118 in operable overlaying registration with a user's ear and cheek. The location structure 126 illustrated in FIG. 1 is configured to interface with the base of a wearer's ear, and includes an ear notch 128 disposed between a front prong 130 and a rear prong 132. As illustrated, the location structure 126 is configured to comfortably index an end of a band 104 in registration with the base of an ear.

Sometimes, structure is provided to assist in installing a telephone in operable position between a lever arm 118 and a user's cheek. One operable installation-assist structure includes finger-notch 134 in FIG. 1. A second operable installation-assist structure includes textured surface generally indicated at 136. A third operable installation-assist structure includes finger-hooking structure, generally 138 in FIG. 7, configured to permit application of a lifting force on lever arm 118 effective to facilitate inserting a telephone under the distal portion of the lever arm. Finger-hooking structure 138 may include a single rail 140 that is spaced apart from a rear surface of lever arm 118. A rail, or other finger-interface structure, may be disposed in any desired and operable location. As illustrated, finger-hooking structure may include a plurality of rails (or other structure), such as first rail 140 and second rail 142, to provide a plurality of alternative locations at which the lifting force may be applied, or simply to permit stabilizing the lever arm when installing a telephone. Rails may be shaped to any desired configuration, including curved configurations. It is within contemplation to provide one or more cutouts to reduce potential reduction in sound transmittal caused by the clamp lever and cantilevered base. One such cut-out may be disposed and arranged to provide a finger receptacle at the posterior grip area that can be "hooked" by a finger tip while installing a telephone.

To install a telephone in a one-handed operation, a user may squeeze the sides of a telephone between thumb and three fingers, and apply a free finger to installation-assist structure, such as the notch 134, surface 136, or finger-hooking structure 138, to stabilize the lever arm 118 while the telephone is slid into an installed position. A telephone 144 is illustrated in a typical installed position in FIG. 3. An installed telephone is pressed in compression against a user's ear and cheek by a bias caused in the cantilevered arm by installation of the telephone. That is, the telephone 144 is pressed by lever arm 118 in compression against the user's cheek 146 and ear 148. The lever arm 118 is operable to hold a telephone in registration with a user's ear by compressing the telephone against a user's cheek and ear at an interface such that the weight of the telephone is entirely supported by a first friction force generated at that interface and a second friction force generated between the lever arm and telephone.

With reference now to FIG. 2, an alternative hands-free telephone holder is generally indicated at 150. A proximal portion of cantilevered lever arm 118' in FIG. 2 is affixed to band 104. The distal portion of a lever arm may be regarded as a contact plate that presses against the back of a telephone. Sometimes, it may be desirable to provide contacting structure having adjustable degrees of freedom to better accommodate to the rear surface of a telephone. The distal portion of lever arm 118' carries a contact plate 152 that can be adjusted to better align its contact surface to the back surface of a telephone. An operable contact plate may be configured to flex or pivot about axis 154, as illustrated by FIGS. 2 and 4. An operable contact plate may also, or alternatively, be configured to twist about axis 156. An operable contact plate may also, or alternatively, be configured to swivel about axis 158 (see FIG. 4). The contact plate 160 is associated with cantilevered lever arm 118" by way of a ball-and-socket coupling, generally 162.

Sometimes, it is desirable to collapse a hands-free telephone holder to fit into a smaller space, such as for storing the device in a purse, or in a nook in a car. The embodiment 150 includes a hinge, generally 164, disposed to permit rotating the sides 106' and 108' around fold axis 166 to bring them together into proximal alignment. If desired, a clamp lever may also be configured to permit rotating it with respect to its anchor foundation, such as illustrated in FIG. 1. As illustrated, the upstanding member 120 may be anchored through bearing 168 that is structured to permit swinging the lever arm 118 around a swing axis 170. Therefore, the lever arm 118 may be swung to an out-of-the-way location when the wearer of a device, such as hands-free telephone holder 100, is not using the telephone, or for compact storage.

Certain embodiments of cantilevered lever arms may be structured to lengthen to better accommodate a range of telephone configurations. As illustrated in FIG. 2, an extension link 172 structured to permit adjusting an effective cantilevered length of lever arm 118'. An extension link, such as extension link 172, may be structured to fit in registration inside a slot, similar to construction of length-adjustment mechanism 110. Of course, alternative construction will be apparent to those of ordinary skill in the art, and are within the ambit of the instant invention.

A contact plate portion of a lever arm may carry gripping means to increase a holding force applied to the rear surface of a telephone. Such gripping means can include any structure effective to assist in holding a telephone in an installed position. Operable such assist structure includes friction-enhancing material, such as rubber pad 174 in FIG. 5, and suction cups 176 in FIG. 6. In any case, it is desirable for the distal end of a cantilevered lever arm to be configured with an upturn, generally indicated at 178, to facilitate inserting a telephone under the lever arm. In general, an upturn 178 may be associated with any edge of a contact plate to facilitate insertion of a telephone into an installed position.

As illustrated in FIG. 8, a band may include structure adapted to facilitate use of a hands-free telephone holder while wearing glasses. The bridge 180 formed in band 104" is configured to provide a channel 182 in which to accommodate an ear piece of eye glasses. Of course, a bridge may be associated with either side, or both sides, of a band to accommodate one or both eyeglass ear pieces.

A workable hands-free telephone holding device structured according to certain principles of the instant invention may be manufactured from a length of resilient wire, e.g. formed, or bent into an approximate skeletal outline of the illustrated embodiment. It is currently preferred to manufacture telephone holding devices by injection molding plastic, or plastic-like materials, into substantially the shape illustrated. It is within contemplation that a combination of materials may be employed to impart desired properties, such as by over-molding a bias-imparting elastic metal portion with a plastic, plastic-like, or rubber compound.

While the invention has been described in particular with reference to certain illustrated embodiments, such is not intended to limit the scope of the invention. The present invention may be embodied in other specific forms without departing from its spirit or essential characteristics. Various disclosed structural features may be assembled in different combination to create alternative embodiments within the ambit of the instant invention. The scope of the invention is, therefore, indicated by the appended claims. All changes which come within the meaning and range of equivalency of the claims are to be embraced within their scope.

What is claimed is:

1. An apparatus, comprising: a band configured and arranged to partially encircle a human head; and a clamp mechanism disposed in association with said band and operable to hold a telephone in compression against a user's cheek and ear such that the weight of said telephone is substantially supported by friction that is generated: at a first interface disposed between said telephone and said cheek and ear; and at a second interface disposed between said telephone and said clamp mechanism.

2. The apparatus of claim 1, wherein:
said band comprises location structure configured to interface with the base of an ear of said user.

3. The apparatus of claim 2, wherein:
said location structure comprises an ear notch disposed between a front prong and a rear prong.

4. The apparatus of claim 1, wherein:
said band comprises a mechanism configured to permit adjustment of a length of said band effective to fit said band to heads having different sizes.

5. An apparatus, comprising:
a band configured and arranged to partially encircle a human head; and
a clamp mechanism disposed in association with said band and operable to hold a telephone in compression against a user's cheek and ear such that the weight of said telephone is substantially supported by friction, wherein:
said clamp mechanism comprises:
an upstanding member affixed to said band; and
a cantilevered lever arm associated with said upstanding member.

6. The apparatus of claim 5, wherein:
a proximal portion of said upstanding member is pivotally affixed to said band.

7. The apparatus of claim 5, wherein:
a proximal portion of said lever arm is associated with said upstanding member by way of a mechanism permitting adjustment of an anchor position of said lever with respect to said upstanding member effective to accommodate telephones having different thicknesses.

8. The apparatus of claim 5, wherein:
said lever arm comprises an extension link structured to increase an effective cantilevered length of said lever arm.

9. The apparatus of claim 5, wherein:
said lever arm comprises a contact plate structured and arranged to pivot about a first axis effective to align a contact surface of said contact plate with a rear surface of a telephone.

10. The apparatus of claim 9, wherein:
said contact plate is further structured and arranged to permit swivelling said contact plate about a second axis that is disposed substantially orthogonal to said first axis.

11. The apparatus of claim 1, wherein:
said band is structured to permit collapse of said band for storage of said apparatus in a smaller space.

12. The apparatus of claim 5, wherein:
a distal end of said cantilevered lever arm is configured with an upturn to facilitate inserting a telephone under a distal portion of said lever arm.

13. The apparatus of claim 12, wherein:
said cantilevered lever arm comprises finger-hooking structure configured to permit application of a lifting force on said lever arm effective to facilitate inserting a telephone under said distal portion of said lever arm.

14. The apparatus of claim 13, wherein:
said finger-hooking structure comprises a rail spaced apart from a rear surface of said cantilevered lever arm.

15. The apparatus of claim 13, wherein:
said finger-hooking structure comprises:
- a first rail spaced apart from a rear surface of said cantilevered lever arm; and
- a second rail spaced apart from a rear surface of said cantilevered lever arm; wherein:
said first rail and said second rail provide alternative locations at which said lifting force may be applied.

16. The apparatus of claim 11, further comprising:
bridge structure carried by said band and configured provide a channel in which to accommodate an ear piece of eye glasses.

17. The apparatus of claim 5, wherein:
a distal end of said cantilevered lever arm carries gripping means to increase a friction force applied to the rear surface of a telephone.

18. An apparatus, comprising:
- a band configured and arranged to partially encircle a human head, said band being structured to permit a user to wear said band as a separate entity; and
- a cantilevered lever arm anchored at a proximal end to said band and operable to hold a telephone in registration with a user's ear by compressing said telephone against said user's cheek and ear at an interface such that the weight of said telephone is entirely supported by a first friction force generated at said interface and a second friction force generated between said lever arm and said telephone.

19. The apparatus of claim 18, further comprising:
- a mechanism configured to permit adjustment of a length of said band effective to fit said band to heads having different sizes; and
- means to adjust said lever arm effective to accommodate telephones having different thickness;
  wherein:
said band comprises location structure effective to orient said lever arm in overlaying registration with said user's ear.

20. The apparatus of claim 19, further comprising:
means to facilitate installation of a telephone into reception between a distal portion of said lever arm and a user's ear and cheek.

* * * * *